United States Patent Office 3,152,817
Patented Oct. 13, 1964

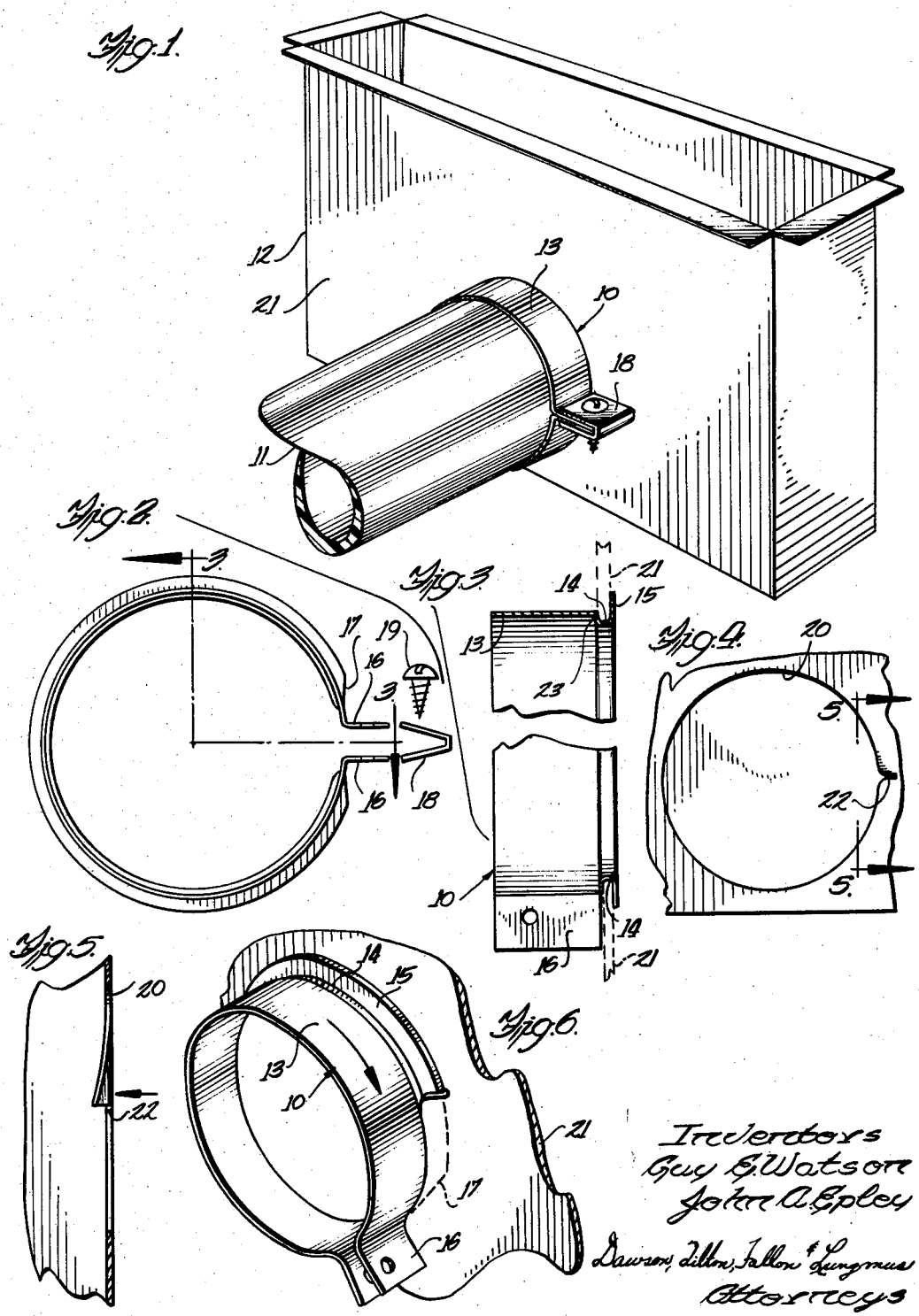

3,152,817
CONNECTOR FOR JOINING THE ENDS OF PIPES TO APERTURED PANELS
Guy E. Watson and John A. Epley, Wichita, Kans., assignors to The Coleman Company, Inc., Wichita, Kans., a corporation of Kansas
Filed Oct. 23, 1961, Ser. No. 146,730
2 Claims. (Cl. 285—158)

This invention relates to a pipe connector, and more specifically, to a device for attaching the ends of pipes to flat apertured walls or panels so that the interiors of the pipes are in direct communication with such apertures.

It has long been a problem to provide a simple and effective means for joining pipes or cylindrical ducts to flat sheet metal surfaces such as, for example, the apertured walls of distribution chambers and mixing chambers. Adapters are sometimes provided for this purpose but such adapters must ordinarily be inserted from the interior of the chamber and, therefore, where the interior is not readily accessible some other attachment means must be provided. An adapter with an outwardly flared skirt which may be screwed or welded to the outer surface of the chamber might be used but, aside from its unsightly appearance, such a construction is ordinarily unsatisfactory because of the time and effort required for its installation and because of the gaps which frequently occur between the connected metal parts and which result in inefficient distribution of heated or cooled air.

Accordingly, it is a principal object of the present invention to provide a pipe connector which overcomes the aforementioned defects and disadvantages of present pipe connecting means. Another object is to provide a pipe connecting device which may be quickly and easily manipulated to secure a pipe to an apertured metal panel without welding or bolting the pipe and panel together and without requiring access to both sides of the apertured panel. Another object is to provide a pipe connector which is adapted to engage substantially the entire peripheral edge portion of an opening in a panel to which a pipe is intended to be connected, and which is locked against release of such peripheral edge portion when a pipe is secured to the connector. Another object is to provide a connector which is extremely inexpensive and which may be pressed from sheet metal.

Other objects will appear from the specification and drawings in which:

FIGURE 1 is a broken perspective view of a pipe connector of the present invention joining a pipe and a distribution box;
FIGURE 2 is an end view of the connector with the locking screw and clamp removed therefrom;
FIGURE 3 is a longitudinal sectional view of the connector taken along line 3—3 of FIGURE 2;
FIGURE 4 is a front elevational view of the apertured portion of the distribution box;
FIGURE 5 is an enlarged vertical sectional view taken along line 5—5 of FIGURE 4;
FIGURE 6 is a broken perspective view illustrating the technique of mounting the connector to an apertured panel.

In the embodiment of the invention illustrated in the drawings, the numeral 10 generally designates a pipe connector which secures the end of pipe 11 to the flat wall surface of a distribution box 12. Pipe 11 is cylindrical in shape and, in the illustration given, is indicated as being formed from a plastic material. It is to be understood, however, that pipes formed from other materials such as cast or sheet metals might also be used.

The pipe connector 10 comprises a generally cylindrical collar 13 which is provided adjacent its front end with an annular recess 14 and an outwardly extending C-shaped flange 15. The collar is formed from a single sheet or strap of metal or other flexible material having a pair of ends turned outwardly or radially to define apertured end portions or ears 16. The ears are normally spaced apart as shown in FIGURES 2 and 6, and by urging them together the diameter of the opening defined by the collar is reduced.

Referring to FIGURE 3, it will be observed that the width of each ear, when measured in a direction running longitudinally of the collar, is substantially less than the length of the annular pipe connector. More specifically, each ear has its front edge terminating short of recess 14 so that there will be no interference between the ears and the panel to which the connector is attached.

Flange 15 lies along a single plane and is unbroken along the collar from one ear to the other. As shown most clearly in FIGURES 2 and 6, the ends of the flange terminate in edges 17 which form acute angles with the outer surface of the collar adjacent ears 16. To lock the ears together, a U-shaped clamping member 18 may be fitted over the ears and a screw 19 threaded through the aligned openings of the clamping member and ears.

To mount the connector, an opening 20 is formed in the flat wall 21 of box 12, the size of the opening being substantially smaller than the area of the circle defined by the periphery of flange 15 even when the ears of the connector are tightly clamped together. In addition, the opening is the same size or slightly larger than the recessed portion 14, and is slightly smaller than the external dimensions of the cylindrical collar 13, even when the connector ears are clamped together.

The wall 21 in which opening 20 is located is provided with at least one radial slot 22 which merges with the opening and which has radial dimensions greater than that of flange 15. Wall 21 is normally formed from thin gauge sheet metal and is therefore bendable or flexible to a limited extent. To mount the connector, an operator simply urges one of the sloping leading edges 17 of the flange 15 into the slot 22 and then rotates the connector directly in front of the opening in order to thread the entire flange through the slot and behind wall 21 (FIGURE 6). Since only the recessed portion of the connector is of sufficiently small diameter to be received within opening 20, the connector is firmly anchored against axial movement with respect to the wall 21.

Thereafter, the end of pipe 11 is inserted into the open collar until the extreme end of the pipe abuts against the shoulder 23 which is the inner formation of outer recess 14. The pipe itself does not contact the wall or panel 21 and, therefore, there is no likelihood that contact between the pipe and the wall will produce deformations in wall surface 21.

Finally, after the end of the pipe has been fully inserted into collar 13, the clamping member 18 is fitted over ears 16 and screw 19 is threaded into the aligned openings of the ears and clamping member. The collar is thereby tightly clamped about the pipe and prevents axial movement of the pipe with reference to the connector or to the wall upon which it is mounted.

It is believed apparent from the foregoing that the pipe connector of the present invention constitutes a highly effective and simple means for securely attaching a pipe to an apertured wall. Such a connection may be achieved without access to both sides of the wall or panel except through opening 20. With the connector fully in place, contact between the inner surface of the wall or panel and the single arcuate flange 15 effectively holds the connector in place and seals the parts together.

It will also be observed that the interconnection of the pipe and wall panel 21 is achieved without deforming the pipe itself and without requiring a pipe of special construction. As already indicated, the pipe may be formed from any suitable material as long as it is sufficiently rigid to be clamped in place by constriction of collar 13.

While in the foregoing we have disclosed an embodiment of the invention in considerable detail for purposes of illustration, it will be understood by those skilled in the art that many of these details may be varied without departing from the spirit and scope of the invention.

We claim:

1. In combination, a pipe connector comprising a generally C-shaped collar formed from a single strap of flexible material having an axially extending portion with radially outwardly turned and normally circumferentially spaced end portions, means cooperating with said end portions for urging the same towards each other to clamp the end of a pipe within said collar, said collar being provided at one end thereof with an outwardly projecting flange J-shaped in cross section, the upper end of the short leg of said J-shaped flange being secured to said axially extending portion, said flange extending peripherally about said collar from approximately one of said end portions to the other of said end portions of said axially extending portion, and a panel having an opening therethrough of a diameter smaller than the diameter of the shorter leg of said J-shaped flange but larger than the external diameter of said collar measured across the bight of said J-shaped flange, and a radial slit provided in said panel and extending outwardly from said opening a distance greater than the radial width of said flange, whereby, upon rotation of said pipe connector with reference to said panel said flange may be slid through said slit to connect the panel and connector and thereafter said end portions may be urged together to clamp the end of a pipe within said connector and to anchor the pipe against axial movement with respect to said panel.

2. The structure of claim 1 in which the bight portion of said J-shaped flange provides an internal annular shoulder for limiting the extent of insertion of a pipe therein.

References Cited in the file of this patent
UNITED STATES PATENTS

| | | |
|---|---|---|
| 1,398,083 | Tibbetts | Nov. 22, 1921 |
| 1,484,491 | Gutermann | Feb. 19, 1924 |
| 1,975,925 | Compo | Oct. 9, 1934 |

FOREIGN PATENTS

| | | |
|---|---|---|
| 526,669 | Germany | Sept. 26, 1929 |